Figure 5:
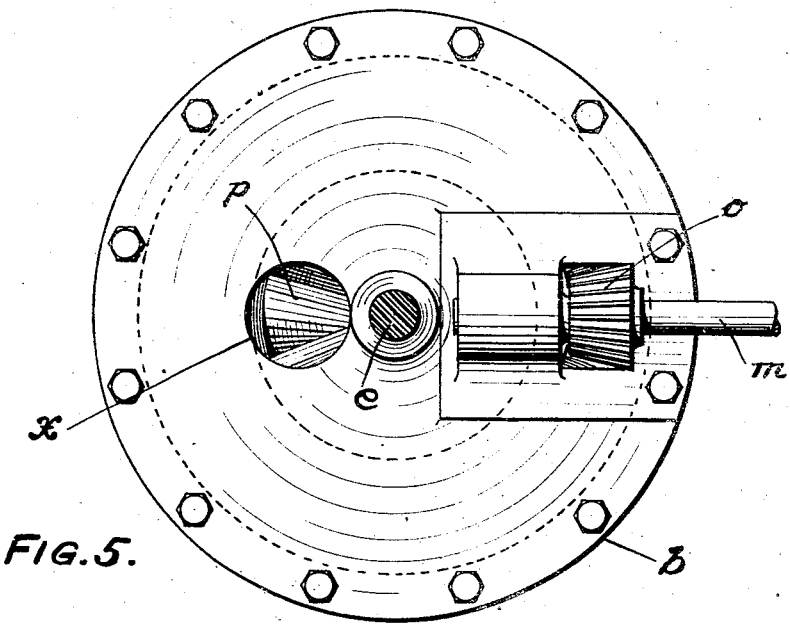

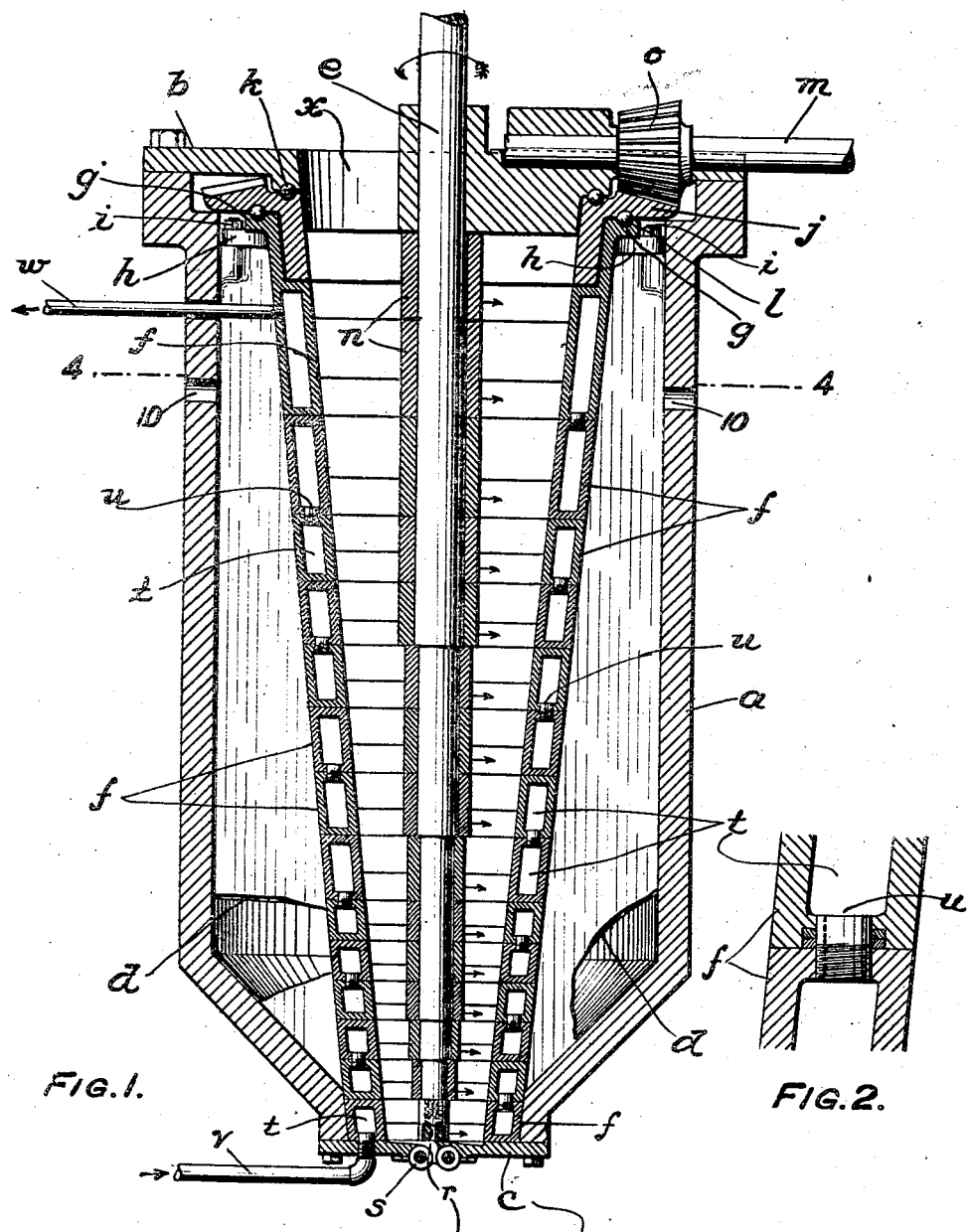

F. I. DU PONT.
APPARATUS FOR TREATING EXPLOSIVE POWDER.
APPLICATION FILED MAR. 1, 1909.

1,017,286.

Patented Feb. 13, 1912.

3 SHEETS—SHEET 2.

WITNESSES:

INVENTOR

ATTORNEYS.

F. I. DU PONT.
APPARATUS FOR TREATING EXPLOSIVE POWDER.
APPLICATION FILED MAR. 1, 1909.

1,017,286.

Patented Feb. 13, 1912.

3 SHEETS—SHEET 3.

WITNESSES:
Rob't R Kitchel.
E. E. Wall

INVENTOR
Francis I. du Pont
BY
ATTORNEYS.

UNITED STATES PATENT OFFICE.

FRANCIS I. du PONT, OF WILMINGTON, DELAWARE, ASSIGNOR TO THE E. I. du PONT DE NEMOURS POWDER COMPANY, OF WILMINGTON, DELAWARE, A CORPORATION OF NEW JERSEY.

APPARATUS FOR TREATING EXPLOSIVE POWDER.

1,017,286.      Specification of Letters Patent.      Patented Feb. 13, 1912.

Application filed March 1, 1909. Serial No. 480,580.

*To all whom it may concern:*

Be it known that I, FRANCIS I. DU PONT, a citizen of the United States, residing at Wilmington, county of Newcastle, and State of Delaware, have invented a new and useful Improvement in Apparatus for Treating Explosive Powder, of which the following is a full, clear, and exact description, reference being had to the accompanying drawings, which form a part of this specification.

In certain explosive powders, for instance, black powder, when produced by the process of evaporating a mixture consisting of a solution of one or more of the ingredients with the other ingredients after the evaporation is carried on to a certain point, it is desirable to cool the material in order to partially solidify the same in order that it may be molded into grains or other desired shapes, after which the remainder of the solvent can be driven off in any suitable manner. This cooling process has to be carried on with certain precautions rendered necessary by the tendency of the dissolved ingredients to form crystals and thereby produce a separation or at least a less intimate co-mingling of the ingredients one with another in the final produce than is demanded by good practice in manufacturing explosives.

The object of my invention is the production of an apparatus which, during the cooling, will give the material such a kneading or working of one particle in its relation to another, that this crystallization is deferred as long as possible, and when it finally occurs the crystals, if they exist at all, are so small that the mass resembles an amorphous substance. It is also desirable to have some form of apparatus which will feed the material out into a uniform sheet or strip from which grains can be cut. In general, I accomplish these two results by the use of my novel apparatus, in which the material is forced forward through a vessel, the walls of which are directly cooled. In this vessel are arranged a number of stationary blades oblique to the direction in which the material is to travel, and between each set of these blades is a set of revolving blades, also oblique to the direction in which the material is to travel. At the end which receives the powder in its hot or warm condition, the stationary blades approach the position of being parallel to the axis of the vessel, while at the other end where the material is delivered out into a sheet, the stationary blades approach the position of being at right-angles to the axis, and in all cases these stationary blades assume more or less of a propeller-like or helicoidal shape. These stationary blades decrease in number as the discharging end of the machine is approached until at the end there are but two. These are of a helicoidal shape and form a screw whose pitch is about equal to the width of the strip which is being discharged to the small rolls, so that all of the powder as it assumes a rotary motion is fed directly out by this rotary motion following the helix into both sides of the thick strip which is being thinned down by the rolls. In regard to the revolving propeller blades, the opposite condition obtains at the end where the powder is received, these having a position more nearly at right-angles to the axis of the vessel, while as the other end is approached their obliquity changes so that they become more nearly parallel to the axis of the vessel. By this arrangement the material as it enters, first is conveyed forward bodily without much rotary motion, while as it approaches the other end it revolves around almost as rapidly as the revolving propeller blades, and it advances much less rapidly. The purpose of this arrangement is to cause the material, which during this passage is, owing to the cooling action of the walls of the vessel, becoming more solid to issue from the orifice with a sufficient degree of force and to permit its issuing in a strip-like or sheet-like form, instead of in a substantially cylindrical form, as would have to be the case if the same obliquity of the blades which obtains at the receiving end of the apparatus were continued throughout its length. At the discharging end of the apparatus are arranged a pair of rollers whose purpose is to reduce the size of the strip of material issuing from the apparatus to the desired thinness and to determine the evenness of the flow of material, that is to say, since the surface of the rollers determines the speed of the material, a cylindrical roller is chosen as an apparatus which will determine the same speed of flow throughout all parts of the strip of powder issuing from the machine.

I will now describe the embodiment of my invention illustrated in the accompanying drawings.

Figure 4:
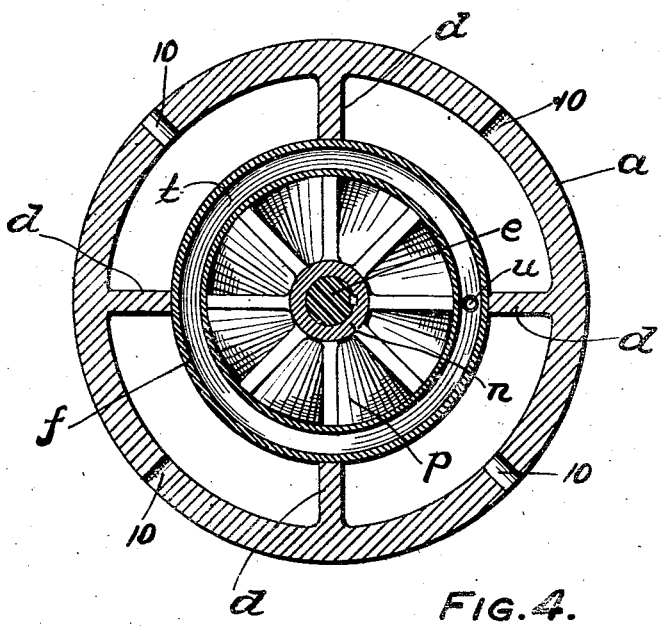
Figure 6:
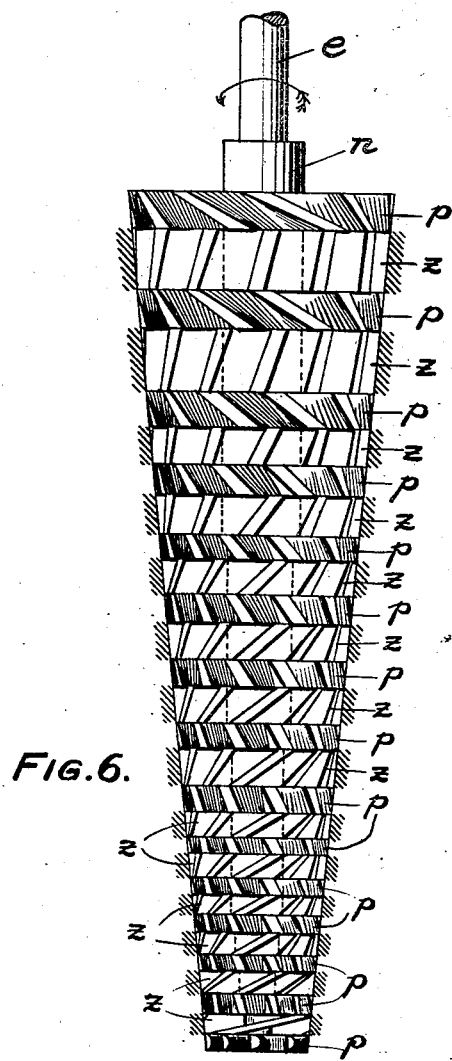
Figure 7:
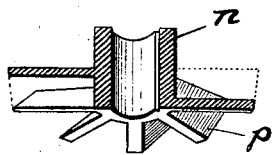
Figure 8:
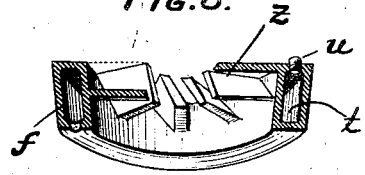
Figure 9:
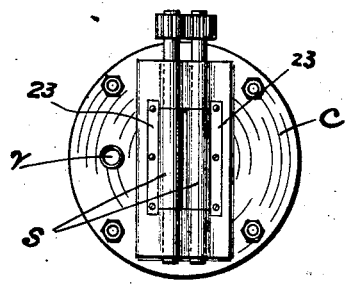
Figure 10:
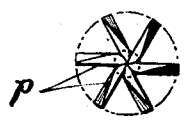

In the drawings: Figure 1 is a longitudinal sectional view through my improved apparatus; Fig. 2 is a detail section of connection between sections of casing; Fig. 3 is a detail section of the delivery rolls; Fig. 4 is a cross section on line 4—4 Fig. 1; Fig. 5 is a top plan view; Fig. 6 is an elevational view showing the relation of the rotating and fixed blades, the rotating blades being shown shaded; Fig. 7 is a perspective view showing a section through a rotating blade; Fig. 8 is a perspective view showing a section through a fixed blade; Fig. 9 is an inverted plan view of the delivery end; Fig. 10 is an inverted plan view of the bottom rotating blade.

$a$ is the surrounding conical casing having the heads $b$ and $c$, secured thereto by bolts and the webs $d$.

$e$ is a shaft central of the casing $a$. Surrounded by this casing $a$ is a conical vessel formed of the sections $f$, which are centered between the webs $d$. The inlet section $f$ has a flange $g$ to which is secured the lug $h$, through which and into the webs $d$ the bolts $i$ pass. Keyed to the shaft $e$ is the bevel gear $j$. Between this bevel gear and the head $b$ is the ball race $k$, and between the gear and the flange $g$ is a corresponding bell race $l$.

$m$ is a driving shaft driven by any appropriate means, not shown. Upon this shaft $m$ is the bevel gear $o$ meshing with the bevel gear $j$. By these means the shaft $e$ is rotated.

Surrounding the shaft $e$ and keyed thereto, are the collars $n$ corresponding in number and position to the sections $f$ of the conical vessel. Projecting inward from the interior of each section $f$ are the blades $z$. The angle of the initial set of blades $z$ is approaching parallel with the axis of the vessel, this being at the inlet end of the vessel. The successive sets of blades $z$ toward the outlet end of the vessel have their angles, with respect to the axis, progressively increasing until at the outlet end they are almost at right angles to the axis of the vessel. The number of these blades in the successive series decrease in number until at the outlet end they are two in number. These are, as stated before, of a helicoidal shape and form a screw whose pitch is about equal to the width of the strip to be discharged to the rolls $s$. On the collars $n$ and beyond each set of blades $z$ are projecting blades $p$ which are arranged helically around each other. The angles of these blades at the inlet end are almost at right angles to the axis and from inlet to outlet decrease in angle so that at the exit end they are approaching parallel to the axis. The fixed and rotating blades $z$ and $p$ are contiguous to each other so that, in entering between and leaving the fixed blades, the material is abraded or rubbed between the fixed and rotating blades. The inlet section $f$ is provided with blades $p$ projecting from the collar in advance of the blades $z$ projecting from the vessel or section $f$. The blades $p$ of the outlet section are constructed as before described, and force the powder along the spiral surface of the inner face of said head $c$ to the orifice or opening $r$, in line with which, and exterior of the head, are mounted the rolls $s$, geared together and driven by means, not shown, the faces of which are of the width of the desired powder strip. In order to keep the rollers free from any attached material, I use the wipers 22, which are pressed against the rolls by the plates 23.

The walls of the sections $f$ are cored, as shown, at $t$ and the cored part of each section is provided with an orifice in which is a pipe $u$ to form communication between the cores of contiguous sections. The cooling liquid is admitted through pipe $v$ passing through head $c$ into the cored portion $t$ of the last section $f$, from which it passes successively through the cored portion of each section, and passes out at the inlet end of the apparatus through pipe $w$. Thus the wall of the vessel itself is directly chilled close to the material, which enables the solidifying by cooling to be more efficiently carried on. Further, the coolest liquid affects the section at the exit where the material is approaching the desired solidification, and therefore needs the greatest effect of cooling.

The powder to be treated is fed in through the opening $x$ and by the conveying blades $p$ carried into the first set of fixed blades or die $z$, from which it is taken by the next set of conveying blades $p$, and forced through the next set of fixed blades or die $z$ and so on to the exit end where it is forced between the faces of the rollers, the powder during the whole treatment being subjected to cooling applied directly to the surface of the wall of the vessel against which the powder contacts. The powder is thus subjected to kneading as the material is solidified to the desired extent by cooling, and all tendency to crystallization is prevented.

The walls of the sections $f$ being cored, result in a light construction. The space between the sections $f$ and the surrounding casing $a$ is quite considerable. Further, the casing $a$ is provided with vents 10. In case of explosion in the vessel rupturing the walls, the produced gases will find ready escape through the vent 10.

Having now fully described my invention, what I claim and desire to protect by Letters Patent is:

1. In an apparatus of the character and for the purpose described, a vessel, having in its length and on its interior alternate sets of fixed and rotating blades, the angles with respect to the axis, of successive sets of fixed blades increasing and the angles with respect to the axis, of successive sets of rotating blades decreasing, from the inlet to the exit.

2. In an apparatus of the character and for the purpose described, a vessel, having in its length and on its interior alternate sets of fixed and rotating blades, the angles with respect to the axis, of successive sets of fixed blades increasing and the angles with respect to the axis, of sucessive sets of rotating blades decreasing, from the inlet to the exit, and the number of fixed blades, in successive sets, decreasing.

3. In an apparatus of the character and for the purpose described, a vessel, having in its length and on its interior alternate sets of fixed and rotating blades, the angles with respect to the axis of successive sets of fixed blades increasing and the angles with respect to the axis of successive sets of rotating blades decreasing, from the inlet to the exit, the fixed blades at the outlet end forming a screw, there being an outlet in line of action of said screw, and rolls, exterior to the machine, in line with said opening.

4. In an apparatus of the character and for the purpose described, a vessel, having in its length and in its interior alternate sets of fixed and rotating blades, the angles, with respect to the axis of successive sets of fixed blades increasing, and the angles with respect to the axis of successive sets of rotating blades decreasing in angle from the inlet to the exit, each set of fixed and rotating blades being contiguous to each other.

5. In an apparatus of the character and for the purpose described, in combination, a conical vessel having in its length and on its interior alternate sets of fixed and rotating blades, the angles with respect to the axis of successive sets of fixed blades increasing, and the angles with respect to the axis of successive sets of rotating blades decreasing from the inlet to the exit.

6. In an apparatus of the character and for the purpose described, in combination, a conical vessel having in its length and on its interior alternate sets of fixed and rotating blades, the angles with respect to the axis of successive sets of fixed blades increasing, and the angles with respect to the axis of successive sets of rotating blades decreasing from the inlet to the exit, each set of fixed and rotating blades being contiguous to each other.

7. In an apparatus of the character described, in combination, a fixed vessel, a central rotating shaft, sets of fixed blades projecting inward from the interior of the vessel, and sets of blades, helically around and projecting outward from said shaft, the sets of fixed and rotating blades alternating with each other in the length of the vessel, the angles, with respect to the axis, of the sets of fixed blades increasing, and the angles, with respect to the axis, of the sets of rotating blades decreasing from the inlet to the exit.

8. In an apparatus of the character described, in combination, a fixed vessel, a central rotating shaft, sets of fixed blades projecting inward from the interior of the vessel, and sets of blades, helically around and projecting outward from said shaft, the sets of fixed and rotating blades alternating with each other in the length of the vessel, the angles, with respect to the axis, of the sets of fixed blades increasing, and the angles, with respect to the axis, of the sets of rotating blades decreasing from the inlet to the exit, and the number of fixed blades, in successive sets, decreasing.

9. In an apparatus of the character described, in combination, a fixed vessel, a central rotating shaft, sets of fixed blades projecting inward from the interior of the vessel, and sets of blades, helically around and projecting outward from said shaft, the sets of fixed and rotating blades alternating with each other in the length of the vessel, the angles, with respect to the axis, of the sets of fixed blades increasing, and the angles, with respect to the axis, of the sets of rotating blades decreasing from the inlet to the exit, the fixed blades at the outlet end forming a screw, there being an outlet in line of action of said screw, and rolls exterior to the machine, in line with said opening.

10. In an apparatus of the character described, in combination, a fixed vessel, a central rotating shaft, sets of fixed blades projecting inward from the interior of the vessel, and sets of blades, helically around and projecting outward from said shaft, the sets of fixed and rotating blades alternating with each other in the length of the vessel, the angles, with respect to the axis, of the sets of fixed blades increasing, and the angles, with respect to the axis, of the sets of rotating blades decreasing from the inlet to the exit, each set of fixed and rotating blades being contiguous to each other.

11. In an apparatus of the character described, a conical vessel formed of sections, each section having on its interior a set of projecting blades, a central shaft, sets of blades rotating with said shaft extending helically around said shaft, and projecting inward from said shaft, said fixed and rotating blades alternating in the length of the vessel, the angles, with respect to the axis, of the sets of fixed blades increasing, and the angles, with respect to the axis, of the sets of rotating blades decreasing from the inlet to the exit.

12. In an apparatus of the character described, a conical vessel formed of sections, each section having on its interior a set of projecting blades, a central shaft, sets of blades rotating with said shaft extending helically around said shaft, and projecting inward from said shaft, said fixed and rotating blades alternating in the length of the vessel, the angles, with respect to the axis, of the sets of fixed blades increasing, and the angles, with respect to the axis, of the sets of rotating blades decreasing from the inlet to the exit, and the number of fixed blades, in successive sets, decreasing.

13. In an apparatus of the character described, a conical vessel formed of sections, each section having on its interior a set of projecting blades, a central shaft, sets of blades rotating with said shaft extending helically around said shaft, and projecting inward from said shaft, said fixed and rotating blades alternating in the length of the vessel, the angles, with respect to the axis, of the sets of fixed blades increasing, and the angles, with respect to the axis, of the sets of rotating blades decreasing from the inlet to the exit, the fixed blades at the outlet end forming a screw, there being an outlet in line of action of said screw, and rolls exterior to the machine, in line with said opening.

14. In an apparatus of the character described, a conical vessel formed of sections, each section having on its interior a set of projecting blades, a central shaft, sets of blades rotating with said shaft extending helically around said shaft, and projecting inward from said shaft, said fixed and rotating blades alternating in the length of the vessel, the angles, with respect to the axis, of the sets of fixed blades increasing, and the angles, with respect to the axis, of the sets of rotating blades decreasing from the inlet to the exit, each set of fixed and rotating blades being contiguous to each other.

15. In an apparatus of the character and for the purpose described, a vessel, having in its length and in its interior alternate sets of fixed and rotating blades, the wall of said vessel being cored, and a liquid inlet and outlet whereby the wall of said vessel close to the interior may be chilled.

16. In an apparatus of the character and for the purpose described, in combination, a conical vessel having in its length and on its interior alternate sets of fixed and rotating blades, the angles, with respect to the axis, of successive sets of fixed blades increasing, and the angles, with respect to the axis, of successive sets of rotating blades decreasing from the inlet to the exit, the wall of said vessel being cored, and a liquid inlet and outlet whereby the wall of said vessel close to the interior may be chilled.

17. In an apparatus of the character and for the purpose described, in combination, a conical vessel having in its length and on its interior alternate sets of fixed and rotating blades, the angles, with respect to the axis, of successive sets of fixed blades increasing, and the angles, with respect to the axis, of successive sets of rotating blades decreasing from the inlet to the exit, each set of fixed and rotating blades being contiguous to each other, the wall of said vessel being cored, a liquid inlet and outlet whereby the wall of said vessel close to the interior may be chilled.

18. In an apparatus of the character described, in combination, a fixed vessel, a central rotating shaft, sets of fixed blades projecting inward from the interior of the vessel, and sets of blades, helically around and projecting outward from said shaft, the sets of fixed and rotating blades alternating with each other in the length of the vessel, the wall of said vessel being cored, and a liquid inlet and outlet whereby the wall of said vessel close to the interior may be chilled.

19. In an apparatus of the character described, in combination, a fixed vessel, a central rotating shaft, sets of fixed blades projecting inward from the interior of the vessel, and sets of blades, helically around and projecting outward from said shaft, the sets of fixed and rotating blades alternating with each other in the length of the vessel, each set of fixed and rotating blades being contiguous to each other, the wall of said vessel being cored, and a liquid inlet and outlet whereby the wall of said vessel close to the interior may be chilled.

20. In an apparatus of the character described, a conical vessel formed of sections, each section having on its interior a set of projecting blades, a central shaft, sets of blades rotating with said shaft extending helically around said shaft, and projecting inward from said shaft, said fixed and rotating blades alternating in the length of the vessel, the wall of said vessel being cored, and a liquid inlet and outlet whereby the wall of said vessel close to the interior may be chilled.

21. In an apparatus of the character described, a conical vessel formed of sections, each section having in its interior a set of projecting blades, a central shaft, sets of blades rotating with said shaft extending helically around said shaft, and projecting inward from said shaft, said fixed and rotating blades alternating in the length of the vessel, each set of fixed and rotating blades being contiguous to each other, the wall of said vessel being cored, and a liquid inlet and outlet whereby the wall of said vessel close to the interior may be chilled.

22. In an apparatus of the character and for the purpose described, in combination, a conical vessel having in its length and on its interior alternate sets of fixed and rotating blades, a surrounding casing having webs to which webs said vessel is secured.

23. In an apparatus of the character and for the purpose described, a vessel, having in its length and on its interior alternate sets of fixed and rotating blades, a surrounding casing having webs to which webs said vessel is secured.

24. In an apparatus of the character described, in combination, a vessel, a central rotating shaft, sets of fixed blades projecting inward from the interior of the vessel, and sets of blades, helically around and projecting outward from said shaft, the sets of fixed and rotating blades alternating with each other in the length of the vessel, a surrounding casing having webs to which webs said vessel is secured.

25. In an apparatus of the character described, a conical vessel formed of sections, each section having on its interior a set of projecting blades, a central shaft, sets of blades rotating with said shaft extending helically around said shaft, and projecting inward from said shaft, said fixed and rotating blades alternating in the length of the vessel, a surrounding casing having webs to which webs said vessel is secured.

26. In an apparatus of the character and for the purpose described, in combination, a vessel, a head, there being an opening through said head, rolls exterior of said head, the space between said rolls being in line with said opening through said head, revolving blades and coacting fixed blades of helicoidal shape forming a screw, contiguous to said head, there being a spiral groove in the inner face of said head leading to said orifice.

In testimony of which invention, I have hereunto set my hand, at Wilmington, Del., on this 26th day of February, 1909.

FRANCIS I. DU PONT.

Witnesses:
WM. STANIAR,
GORDON L. NAYLOR.